United States Patent Office 2,871,213
Patented Jan. 27, 1959

2,871,213

AQUEOUS COMPOSITION COMPRISING RUBBERY COPOLYMER AND CONDENSATION PRODUCT OF FORMALDEHYDE AND METHYLOL-FORMING COMPOUND

Wilhelm Graulich, Leverkusen-Bayerwerk, Gustav Sinn, Bergisch-Neukirchen, Hermann Holzrichter, Leverkusen-Bayerwerk, and Dietrich Rosahl, Koln-Flittard, Germany, assignors to Farbenfabriken Bayer Aktiengesellschaft, Leverkusen, Germany, a corporation of Germany No Drawing. Application February 28, 1956
Serial No. 568,160

Claims priority, application Germany March 3, 1955

6 Claims. (Cl. 260—29.3)

The present invention relates to aqueous emulsions of copolymers and to articles prepared therefrom.

It has been found that aqueous emulsions of copolymers containing reactive groups, more especially carbonyl, carboxyl or carbonamide groups, are particularly suitable for the production of sheet-like structures of all types, if water-soluble resin-forming formaldehyde condensation products are added to these aqueous emulsions. Such emulsions show the surprizing advantage that the sheet produced therefrom can be cross-linked, even without addition of vulcanizing agents, merely by a thermal aftertreatment and advantageously with simultaneous use of condensation catalysts, more especially of acid character.

The term "sheet-like structures" as used in the present specification and the appended claims is to be understood to designate bodies in which one dimension is extremely small in relation to the other two dimensions. Examples of such sheet-like structures are coatings and impregnations of supporting materials, surface-protecting coatings or finishes on inorganic or organic articles, adhesives of all types, films and foils without support and laminated products.

Suitable copolymers for use in the process of the invention can be obtained by polymerizing polymerizable monomers containing reactive groups with other polymerizable compounds.

Particularly suitable as monomers having reactive groups are those which contain besides a polymerizable olefinic group a carbonyl group such as for example aldehyde groups, keto groups, carboxyl and/or carbonamide groups carrying at least one hydrogen atom on the nitrogen. Examples of suitable monomers are α-β-ethylenically unsaturated carboxylic acids, such as acrylic acid, methacrylic acid, monoesters of α-β-ethylenically unsaturated dicarboxylic acids, such as semi-esters of maleic and fumaric acid, preferably with aliphatic alcohols of 1–12 C-atoms or with cycloaliphatic alcohols, such as maleic acid monobutyl ester, maleic acid monocyclohexyl ester, furthermore amides of α-β-ethylenically unsaturated carboxylic acids, such as acrylamide, methacrylamide, acrylic monobutyl amide, acroleins, such as α-methyl acrolein, ketones, such as vinylmethyl ketone.

The following compounds are for example suitable for use as monomers which can be copolymerized with the aforementioned monomers containing reactive groups: diolefines with conjugated double bonds such as butadiene, isoprene, dimethyl butadiene, chloroprene, other monomers with two double bonds such as glycol diacrylates and acrylic acid allyl esters, vinyl and vinylidene compounds, such as styrene, vinyl chloride, vinyl acetate, vinyl butyrate, vinylidene chloride, vinyl ether and acrylic and methacrylic acid derivatives, such acrylonitrile, α-methacrylonitril, acrylic- and methacrylic acid esters, aliphatic and cycloaliphatic alcohols as well as the substitution products and homologues of these products.

The choice of the monomers from among the aforementioned groups is made according to the properties which are required of the sheet-like structures. For example, particularly flexible films are obtained when using major quantities of butadiene, whereas particularly soft coatings, which do not deleteriously affect the handle when applied to fabrics, are obtained by using the acrylic acid esters or vinyl ethers of higher alcohols. Styrene and acrylic acid and methacrylic acid esters in large amounts yield particularly clear films and coatings; acrylonitrile yields particularly hard films and coatings. The proportion of the monomers with reactive groups in the copolymer determines the degree of cross-linking capacity. Since too high a degree of cross-linking generally leads to the film produced being made brittle, the proportion of these monomers in the polymer will be comparatively small and can amount to approximately 0.5–25% of the initial monomers. If too high a proportion of such groups is included and if the cross-linking is controlled by the amount of the formaldehyde condensate, the danger exists that some of the groups will not be blocked and then the way is open for undesirable secondary reactions.

The copolymers are preferably prepared by the well known process of emulsion polymerization. When using monomers containing COOH groups, it has been found desirable to polymerize in the acid pH range, since then these monomers are incorporated in a more satisfactory manner. If it is desired to introduce aldehyde groups, it is additionally recommended that the operation should furthermore be carried out without using peroxide catalysts in order to avoid disproportionation condensation reactions and oxidation to the COOH group.

Moreover, it is also possible for the reactive groups to be subsequently produced in the polymers, for example, by polymers or copolymers containing ester groups being subsequently wholly or partially saponified. In this way, it is also possible to obtain copolymers which contain hydroxyl groups and which are likewise suitable for carrying out the present invention.

As catalysts for the copolymerization there are preferably used reducing sulfur compounds having emulsifying properties such as sodium salts of alkylsulfinic acids, the alkyl group of which containing about 10–18 C-atoms. Further suitable catalysts are dialkylnaphthalene sulfinic acids, the alkyl groups of which have at least 4 carbon atoms, and alkylformamidine-sulfinic acids, the alkyl group of the latter having about 10–18 atoms. These catalysts inhibit the oxidation of aldehyde groups to carboxyl groups and therefore are of special importance in case that acroleins are used as monomers c. However, other known catalysts may be used for the production of copolymers which do not contain aldehyde groups such as Redox-systems or organic peroxides.

The second principal component used in the compositions of the present invention are cross-linking agents consisting of aldehyde-condensation resinoids which are soluble in water. Such compounds are the water-soluble, resin-forming condensation products of formaldehyde with phenol, urea, dicyandiamide, melamine, phenyl sulphonamide and their derivatives. It is advisable that the initial condensation should be carried to such an extent by known processes that the reaction product is still just soluble in water. In this way, a substantially more thorough cross-linking is produced than when starting from the water-soluble monomolecular methylol compounds, although these can also be used. The amounts of cross-linking agents introduced are dependent on the properties required of the sheet formations. For example, in order to produce films having elastic properties, 8 parts by weight of a suitable copolymer will be combined with about 1–2 parts by weight of a cross-linking agent. In order to produce emulsions which are suitable for making stoving lacquers, it has been found advantageous to use about 1–1.5 parts by weight of a cross-linking agent to 3 parts by weight of copolymer. Generally speaking the amount of cross-linking agent may vary within about 1–50 parts per 100 parts of copolymers.

When preparing the emulsions which have been described, care is to be taken that the cross-linking does not occur at the time of mixing the two components. For example, the latex containing COOH groups will be adjusted to a neutral or slightly alkaline condition (pH about 6.5–9) for instance by carefully adding a dilute ammonia or sodium carbonate solution before it is mixed with the aqueous solution of a reaction product of urea and formaldehyde condensed in the presence of triethanolamine. It is also of advantage that the emulsions should have added thereto catalysts for the final condensation of the formaldehyde condensates. For example, ammonia or ammonium salts of inorganic or organic acids such as ammonium phosphate is used, so that at elevated temperature and with ammonia being split off, the remaining acid effects the final condensation of the formaldehyde resin with simultaneous cross-linking.

Fillers, plasticizers, colored pigments and other products which are usually employed can also be added to the emulsions. When using copolymers of butadiene or its derivatives, it is also advantageous that anti-oxidants should be used. For vulcanizing sheet-like structures which are obtained with the use of the aforementioned butadiene copolymers or butadiene-acrylonitrile copolymers, it is not necessary to employ the conventional vulcanizing additives such as sulphur, accelerators or zinc oxide. However, the use of conventional vulcanization mixtures results in films having good strength properties. The emulsions which have been described are suitable for the production of any desired sheet-like structure by the methods usual for the treatment of latices of natural or synthetic rubber and also of other polymer emulsions. The emulsions combined with water-soluble formaldehyde condensation products can be worked by brushing, spraying, dipping, casting or application by means of applicator rollers or a doctor and are also suitable for the production of shaped bodies. The working thereof generally takes place in such manner that the coatings produced therefrom are initially substantially freed from water and thereafter are heated to temperatures above 100° C., preferably above 125° C. in order to produce the cross-linking. The upper temperature limit is determined by the sensitivity to temperature of the supports and also of the coatings themselves. Generally speaking it will not surpass 200° C. When impregnating fabrics, the necessary cross-linking can for example be produced by heating for 5–10 minutes at temperatures above 140° C.

In the following examples, the parts are by weight.

*Example 1*

(a) 58 parts of butadiene 1.3, 38 parts of acrylic acid nitrile and 4 parts of methacrylic acid are emulsified in 150 parts of water containing 4 parts of the sodium salt of a long chain paraffin obtained by reacting a benzine fraction having a boiling point of 220–330° C. with $SO_2$ and chlorine and hydrolyzing the sulfochloride obtained in an aqueous alkaline medium (see U. S. P. 2,046,090). To this emulsion there are added 0.75 part of the sodium salt of an alkylsulfinic acid the alkyl groups of which having 12–18 carbon atoms. As a modifier there are added 0.3 part of diisopropyl-xanthogen-disulfide. The polymerization temperature is kept at 28° C. The polymerization is continued until about 78 percent of the monomers are converted. Thereafter the copolymerization is stopped by adding 1 part of $Na_2S_2O_4$. The latex was cast on to a porcelain plate and initially dried. After being thoroughly dried in air, T-shaped test elements were stamped out of the film produced and initially heated for 1 hour at 100° C. The test element showed the following values:

A strength value of 11 kg./cm.$^2$ with an elongation of more than 2000%.

These values changed after the elements had been subsequently heated at 135° C. in hot air, so that after 30 minutes, the strength value is increased to 21 kg./cm.$^2$ with an elongation of 1900%, while after 90 minutes the strength value is 22 kg./cm.$^2$ and the elongation is 13.60%. No substantial reaction has taken place.

(b) If the latex described under (a) is mixed with 15 parts of a condensation product of phenol and formaldehyde which is still soluble in water and is capable of being condensed to an unsoluble resin and if one part of phthalic acid anhydride (based: on 100 parts of a polymer dry substance) is emulsified into this latex, the following values are obtained from the test elements produced as in (a) with a heating temperature of 135° C.:

After 15 minutes, strength value 26 kg./cm.$^2$ and elongation 1300%;
After 45 minutes, strength value 67 kg./cm.$^2$ and elongation 925%;
After 120 minutes, strength value 64 kg./cm.$^2$ and elongation 480%.

*Example 2*

(a) The emulsion of a copolymer obtained according to process of Example 1 of 65 parts of butadiene, 30 parts of styrene and 15 parts of methacrylic acid is coated on test tubes by dipping and the initially dried film is rolled into rings which serve as test elements. The rings are initially heated for 1 hour at 100° C. and then finally heated at 135° C. With a varying period of heating, the following values are obtained:

After 30 minutes, strength value 163 kg./cm.$^2$, elongation 575%;
After 60 minutes, strength value 165 kg./cm.$^2$, elongation 580%;
After 120 minutes, strength value 127 kg./cm.$^2$, elongation 450%.

Therefore, without any vulcanization additive, strength values are obtained with this polymerization product which are not to be obtained with a copolymer consisting of butadiene and styrene without methacrylic acid, even if vulcanizing agents are added.

(b) If the emulsion described under (a) is mixed, per 100 parts of dry substance, with 10 parts of a condensation product of urea and formaldehyde which is still soluble in water and which is prepared with addition of triethanolamine, the following values are obtained with a vulcanizing temperature of 135° C.

After 30 minutes, strength value 144 kg./cm.$^2$, elongation 490%;
After 60 minutes, strength value 176 kg./cm.$^2$, elongation 455%;
After 90 minutes, strength value 143 kg./cm.$^3$, elongation 325%.

While the strength value remains substantially the same, an additional cross-linking effect is obtained, this being expressed by decreasing breaking elongation.

*Example 3*

A latex of a copolymer of 60 parts of butadiene, 35 parts of acrylonitrile and 5 parts of methacrylamide in the form of its aqueous emulsion is prepared according to the process of Example 1 and combined with 15 parts of a reaction product of formaldehyde and urea condensed with addition of triethanolamine the said product still being soluble in water and being capable of being condensed to an insoluble resin.

3 parts of the formaldehyde reaction product of o-cyclo-hexyl-p-cresol:

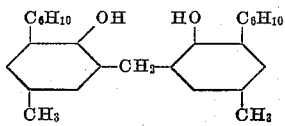

serve as a light-fast age-resisting agent for the rubber.

2 parts of ammonium phosphate serve as condensation activator. Test elements prepared in accordance with the data given in Example 1a are finally heated at 140° C. Depending on the heating period, the following values are obtained:

After 30 minutes, strength value 90 kg./cm.$^2$, elongation 590%;

After 60 minutes, strength value 92 kg./cm.$^2$, elongation 500%;

After 90 minutes, strength value 75 kg./cm.$^2$, elongation 450%.

Example 4

A latex of a copolymer of 45 parts of butadiene, 35 parts of acrylonitrile, 12 parts of styrene and 8 parts of methacrylic acid produced according to Example 1 is stabilized with 3% phenyl-β-naphthylamine and mixed (100 parts of dry substance) with 50 parts of resin-forming a phenol-formaldehyde condensation product which is still soluble in water. 2 parts of $NH_4NO_3$ serve as condensation catalyst. The emulsion resulting therefrom is applied to a sheet of glass and stoved at 145° C. An elastic coating is obtained which is very resistant to scratching and which adheres so firmly to the glass that it can only be detached after breaking it into pieces.

What we claim is:

1. A composition of matter comprising (1) an aqueous medium having a pH value of about 6.5 to 9, (2) 100 parts by weight of a rubbery copolymer obtained by copolymerizing in aqueous emulsions (a) 0.5–25 parts by weight of a monoethylenically unsaturated organic aliphatic compound containing a reactive group selected from the class consisting of carboxyl-, carbonamide-, keto-, and aldehyde groups, and (b) 75–99.5 parts by weight of a conjugated diolefin having 4 to 6 carbon atoms, said copolymer being insoluble in said aqueous medium and being finely dispersed therein, and (3) 1–50 parts by weight of a water-soluble resin-forming condensation product of formaldehyde with a methylol-forming compound selected from the group consisting of phenol, urea, dicyandiamide, melamine, and phenyl-sulphonamide, said condensation product being dissolved in said aqueous medium.

2. A composition of matter comprising (1) an aqueous medium having a pH value of about 6.5 to 9, (2) 100 parts by weight of a coplymer obtained by copolymerizing in aqueous emulsion (a) 0.5–25 parts by weight of a monoethylenically unsaturated organic aliphatic compound containing a reactive group selected from the class consisting of carboxyl-, carbonamide-, keto-, aldehyde groups, and (b) 75–99.5 parts by weight of a mixture of a conjugated diolefin having 4 to 6 carbon atoms and a further monoethylenically unsaturated compound having an ethylenic group as sole reactive group, said copolymer being insoluble in said aqueous medium and being finely dispersed therein, and (3) 1–50 parts by weight of a water-soluble resin-forming condensation product of formaldehyde with a methylol-forming compound selected from the group consisting of phenol, urea, dicyandiamide, melamine, and phenyl-sulphonamide, said condensation product being dissolved in said aqueous medium.

3. Composition of claim 2 wherein the mixture of the diolefin and the further monoethylenically unsaturated compound is approximately 50:50 in parts by weight.

4. A composition of matter according to claim 2, wherein said further monoethylenically unsaturated compound is a monovinylaromatic compound.

5. A composition of matter according to claim 2, wherein said monoethylenically unsaturated organic aliphatic compound is an alpha-beta monoethylenically unsaturated carboxylic acid.

6. A composition of matter according to claim 2, wherein said further monoethylenically unsaturated compound is a mixture of a monovinylaromatic compound and acrylonitrile.

References Cited in the file of this patent

UNITED STATES PATENTS 2,653,140    Allenby et al. _____ Sept. 22, 1953